United States Patent [19]

Kruger et al.

[11] Patent Number: 4,677,478
[45] Date of Patent: Jun. 30, 1987

[54] APPARATUS AND METHOD FOR IMAGING A BODY

[75] Inventors: Robert A. Kruger, Salt Lake City, Utah; Stanley Baron, Stamford, Conn.

[73] Assignee: Thomson-CSF Broadcast, Inc., Stamford, Conn.

[21] Appl. No.: 342,376

[22] Filed: Jan. 25, 1982

[51] Int. Cl.$^4$ .............................................. H04N 5/32
[52] U.S. Cl. .................................. 358/111; 358/166; 364/724
[58] Field of Search .......................... 388/111; 378/99; 250/259, 260, 261, 263, 262, 302, 303; 358/160, 166, 167; 364/515, 724

[56] References Cited

U.S. PATENT DOCUMENTS 4,350,998  9/1982  Verhoeven ........................... 358/111
4,394,684  7/1983  Verhoeven ........................... 358/111

OTHER PUBLICATIONS

R. A. Kruger, "A Digital Video Image Processor for Real Time X-Ray Subtraction Imaging", Optical Engineering/vol. 17, No. 6 (Nov.-Dec. 1978).

Primary Examiner—Edward L. Coles, Sr.
Attorney, Agent, or Firm—Martin M. Novack

[57] ABSTRACT

The disclosure is directed to an improved method and apparatus for obtaining a processed image of a body. In accordance with the disclosed method, a bolus of contrast medium is injected into the body, and the body is irradiated. Radiation which passes through the body is detected and converted into an electronic video signal. The generated video signal is then filtered with a filter function having a temporal frequency response that has a single bandpass peak at a temporal frequency substantially corresponding to the temporal frequency of the movement of the bolus of contrast material through a region of the body. The filtered signal can then be displayed and/or recorded.

13 Claims, 4 Drawing Figures

APPARATUS AND METHOD FOR IMAGING A BODY

BACKGROUND OF THE INVENTION

This invention relates to techniques for obtaining radiographic images and, more particularly, to an apparatus and method for obtaining improved images of opacified anatomy using a fluoroscopic type of equipment in conjunction with a video processor.

A typical x-ray fluoroscopy apparatus includes an x-ray source and an image intensifier which is used to detect the x-radiation. The output of the image intensifier is viewed by a television camera, and the resultant television signal can be presented on a monitor and/or recorded. When a body, such as that of a patient, is interposed between the x-ray source and the detector, x-rays are absorbed in varying degrees depending upon the thickness and composition of different regions of the body. This results in the presentation of a two-dimensional image that can be used, for example, for diagnosing structural abnormalities within the body.

The ability to "see" structure in the body using the described technique depends on the x-ray absorption properties of the structure of interest in relation to the x-ray absorption properties of the material(s) adjacent to the structure. The greater the difference, the greater the "contrast" the structure of interest will have in the resulting television image. The greater the contrast, the greater the clarity of the structure in the image. Consequently, achieving high contrast is a desirable quality with this imaging procedure.

Radiographic contrast agents are used to create a large difference in x-ray absorption behavior where little or none previously existed. For example, blood vessels are virtually invisible on fluoroscopic images (except in the chest) because blood, muscle, fat and soft tissue all possess similar x-ray absorption behavior. Radiographic contrast agents contain material (e.g. air, barium, iodine) which has x-ray absorption properties dissimilar to blood, muscle, fat and the soft tissue. For example, when a bolus of iodinated liquid contrast material is injected into an artery or vein, the vascular structure is given artificially higher contrast on an x-ray image while the contrast material is present within a certain vascular segment.

Digital video processing has been previously employed to improve radiographic imaging. Successful prior art digital processing techniques for image contrast enhancement have taken advantage of a priori knowledge of the time course behavior of radio-opaque contrast agents. By isolating and imaging the flow of such contrast agents through preselected arteries and organs within the body, both anatomical and physiological information related to organ function have been obtained without the need for selective catherization and its attendant risks.

So-called mask-mode imaging is a straightforward form of time-dependent subtraction imaging implemented by digital processing. A patient is placed on an x-ray table and a region of interest is chosen for study, e.g., the carotid arteries, or a heart chamber. A small needle is placed in an arm vein, through which 30–50 ml of iodinated contrast agent later is typically injected. Prior to injection, a single digital image is formed over several video frames (typically one to four) and stored in a digital memory. The contrast agent then is injected rapidly (e.g. in three to five seconds) and flows to the right heart, then to the lungs and to the left heart chambers from where it is pumped throughout the body's arterial system. As the contrast material passes through the region of interest, a sequence of additional images is accumulated within a second digital memory. Each of these post-opacification images is subtracted sequentially from the preinjection image. Subtraction images formed in this way have been synthesized at about one image per second for relatively stationary arterial structures. For rapidly moving cardiac structures the rate has been increased to about fifteen to sixty images per second.

The time-dependent subtraction images thus formed ideally would display only opacified cardiovascular anatomy. In the absence of patient motion, image contrast due to unopacified anatomy, e.g. bones, is removed. The removal of extraneous image information permits contrast enhancement of the opacified structures. Once enhanced, the subtraction images are reconverted to video format and stored, e.g. on a video tape or a video disc. The entire processing and external storage can proceed in real-time with the patient on the table.

Another existing technique, which has been used for imaging the rapidly moving heart, is called time interval difference or "TID" imaging. TID images are formed sequentially from contiguous pairs of images. The technique can be thought of as a special type of mask mode imaging in which the mask image is continually updated. In the case of cardiac imaging, the time interval chosen is short (such as one-fifteenth of a second) and the image sequence approximates the first time derivative of the cardiac motion on a point-by-point basis. Slowly varying motion (patient movement or respiratory motion) is muted and the outlines of the ventricular borders are displayed as black silhouettes during contraction and white silhouettes during expansion.

One can analyze the way in which the mask mode and TID imaging techniques isolate image contrast by considering the temporal frequency response in each technique. In both cases a specific subset of the total dynamic image information is isolated by altering the temporal response of the imaging technique to preserve as much as possible the temporal frequency content of the desired information, while at the same time rejecting temporal frequency components outside of this range.

Consider, as illustrated in FIG. 1, the mask mode response for two points of a body, A and B, in the image plane. One of the points (A) lies over a region containing a peripheral artery and the other (B) lies over a region which does not. The patient is assumed to remain motionless. The temporal frequency spectrum $F_B(\omega)$ associated with stationary anatomy contains information only at zero temporal frequency, since there is no variation of this point with time. $F_A(\omega)$ contains information at zero temporal frequency, as was the case for $F_B(\omega)$, as well as smaller components peaking in the vicinity of 1 to 3 Hz, a result of cardiac motion, and components peaking in the vicinity of 0.1 to 0.3 Hz, associated with the arrival and washout of the contrast bolus during a period of several seconds. The mask mode imaging response for region B therefore is zero and for region A the arterial opacification is displayed. The pulsatile arterial motion associated with periodic cardiac contractions is also visible, but aliased to lower frequencies, a result of imaging at only once per second. In this example, then, the particular temporal response of mask mode imaging is responsible for the isolation of the low contrast arterial structures.

In actual imaging situations, some patient motion usually is present. In the presence of such motion, non-zero temporal frequency components not associated with the passage of the contrast bolus through arterial structures are detected with mask mode imaging and can obscure the detection of arterial structures. Although post-processing a mask mode sequence by choosing an alternative mask often can compensate for patient motion, all too often patient motion results in a less than optimal image and occasionally results in an unuseable image sequence.

One also can analyze the way in which TID imaging isolates cardiac motion from slower varying respiratory motion. The temporal frequency response of TID is obtained by evaluating the Fourier transform ("FT") of $\delta f/\delta t$ since the TID technique approximates the first time derivative on a point by point basis. The Fourier transform has the property that FT $(\delta f/\delta T) = -2\pi i \omega \{F(\omega)\}$. The factor i indicates a 90° phase shift. The important aspect is that the temporal frequency spectrum $F(\omega)$ is weighted by the frequency $\omega$. This implies that low temporal frequency variations (respiration and motion) are suppressed and zero frequency components are eliminated relative to higher frequency variations (cardiac contraction). The frequency response of TID imaging at a rate of 15 Hz is shown in FIG. 2.

It is an object of the present invention to provide improvement over existing techniques for obtaining processed images of the internal structure of a body.

SUMMARY OF THE INVENTION

The present invention is directed to an improved method and apparatus for obtaining a processed image of a body. In accordance with the method of the invention, a bolus of contrast medium is injected into the body, and the body is irradiated. Radiation which passes through the body is detected and converted into an electronic video signal. The generated video signal is then filtered with a filter function having a temporal frequency response that has a single bandpass peak at a temporal frequency substantially corresponding to the temporal frequency of the movement of the bolus of contrast material through a region of the body. The filtered signal can then be displayed and/or recorded.

In accordance with the apparatus of the invention, the detected radiation is converted into a digital electronic video signal before filtering. Filtering is implemented by means of a first recursive filtering subsystem and a second recursive filtering subsystem. The first recursive filtering subsystem includes a first video frame storage means, and a first combining means for combining a first fractional portion of the output of the first frame storage means and the unity complement of said first fractional portion of the input to said first recursive filtering subsystem. The output of the first combining means is coupled back to the input of first frame storage means. The second recursive filtering subsystem includes second video frame storage means and second combining means, these elements being arranged in a manner similar to the arrangement of the first recursive filtering subsystem, but with a second (different) fractional portion and its complement being employed. Finally, means are provided for subjecting the electronic video signal to the first and second recursive filtering subsystems.

In the preferred embodiment of the invention, the output of the second recursive filtering subsystem is subtracted from the output of the first recursive filtering subsystem, and the result is then converted back to analog form before displaying and/or recording. In this embodiment, the desired temporal frequency response is obtained by employing a first fractional portion which is of the order of about 0.06 and a second fractional portion which is of the order of about 0.006. This results in a bandpass characteristic of the system being at a temporal frequency that substantially corresponds to the temporal frequency of the movement of a bolus of contrast material through a region of the body. In this manner, the processed video image tends to enhance portions of the image through which contrast material has moved while attenuating contributions from stationary tissue and from tissue moving at a substantially higher temporal frequency than the bandpass peak (such as at the heart pulsation rate).

Further features and advantages of the invention will become more readily apparent from the following detailed description when taken in conjunction with the accompanying drawings.

DESCRIPTION OF THE PREFERRED EMBODIMENT

Figure 3:
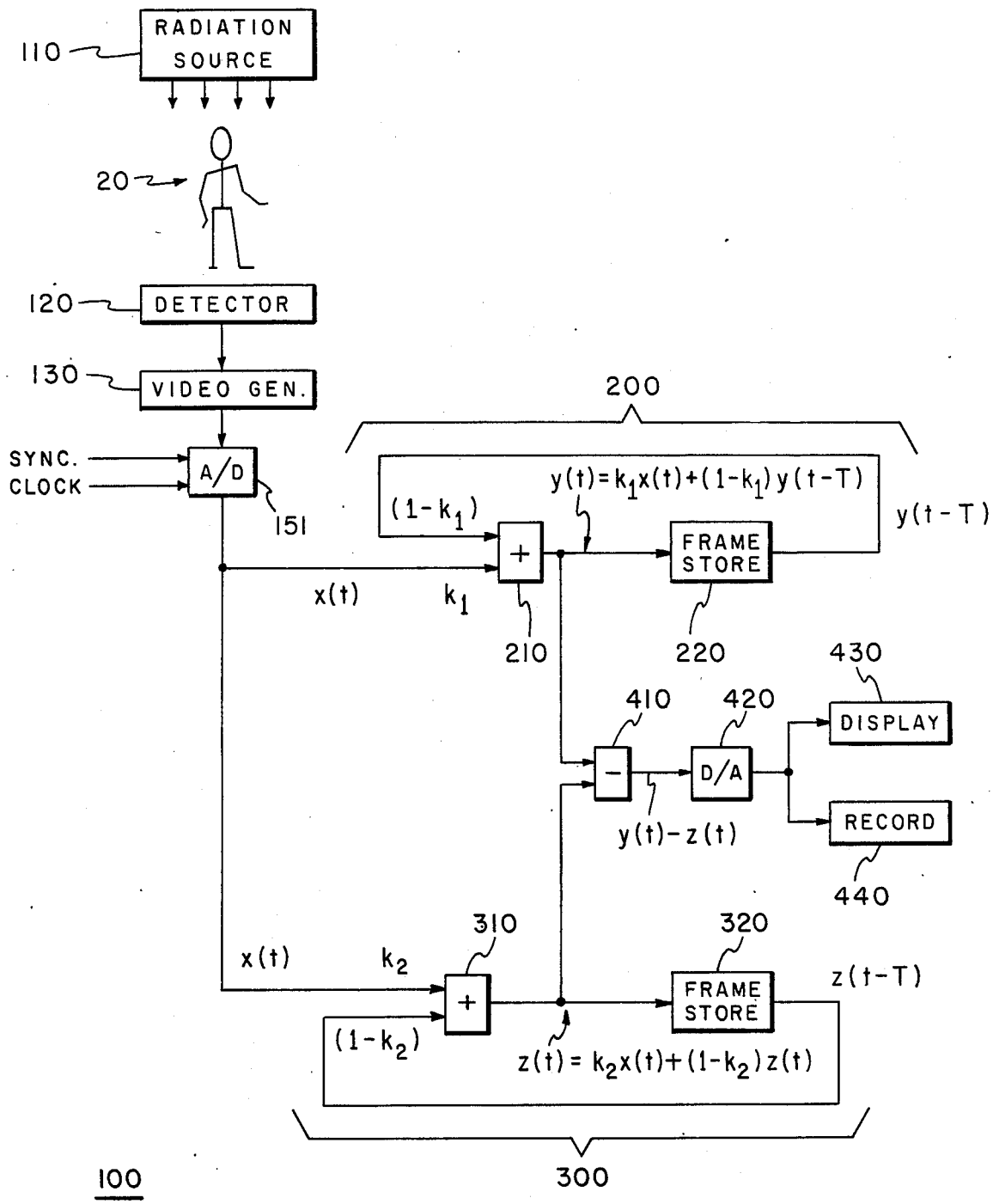
FIG. 3 is a block diagram of an embodiment of an apparatus in accordance with the invention.

Referring to FIG. 3, there is shown a block diagram of an apparatus 100 for obtaining a displayed image of the internal structure of a body 20. The apparatus 100 conventionally includes a radiation source 110, typically an x-ray source, a detector 120, and a video generator 130. The combination of detector and video generator may include, for example, an x-ray image intensifier in conjunction with a television camera. The output of video generator 130 is coupled to an analog-to-digital converter 151 which converts the television signal into digital form. Equipment for obtaining the digitized television signal is well known in the art and commercially available, an example being the model AD-964310 manufactured by Thomson-CSF Broadcast, Inc. At each pixel of the video frame, the television signal digitizer generates an eight bit digital signal representative of one of 256 gradations of luminance level (for a monochrome signal—as considered in the present illustrated embodiment). The video generator and the analog-to-digital converter conventionally receive synchronizing signals, and the analog-to-digital converter also receives a clock signal at the pixel rate.

The output of analog-to-digital converter 151 is coupled to a first recursive filtering subsystem 200 and a second recursive filtering subsystem 300. The subsystem 200 includes an adding circuit 210 that receives, at one input thereof, the signal that is output from analog-to-digital converter 151, and is designated x(t), and receives, at its other input, a signal designated y(t−T), to be described, where T is the video frame period. The input of adding circuit 210 which receives the signal x(t) is weighted by a weighting factor $k_1$, and the input of adding circuit 210 which receives the signal y(t−T) is weighted by a weighting factor $(1−k_1)$. The output of adding circuit 210 is a signal designated y(t), and this signal is coupled to a digital frame store 220. The digital frame store may comprise, for example, a model FS-963155 digital video frame store manufactured by Thomson CSF Broadcast, Inc. or, alternatively, may be any suitable memory, such as a random access memory, having pixel addresses that are synchronized with the pixel addresses of the rest of the system by deriving said addresses from common sync and clock signals. The output of the digital frame store 200, in this embodiment, is the signal designated y(t), i.e., the output of the adding circuit 210.

The second recursive filtering subsystem 300 includes an adding circuit 310 that receives, at one input thereof, the signal that is output from analog-to-digital converter 151, and is designated x(t), and receives, at its other input a signal designated z(t−T), to be described. The input of adding circuit 310 which receives the signal x(t) is weighted by a weighting factor $k_2$, and the input of adding circuit 310 which receives the signal z(t−T) is weighted by a weighting factor $(1−k_2)$. The output of adding circuit 310 is a signal designated z(t), and this signal is coupled to a digital frame store 320 which may be of the same type as digital frame store 220.

The output signal y(t) from subsystem 200 and the output signal z(t) from subsystem 300 are coupled to difference circuit 410 wherein the difference y(t)−z(t) is obtained. This difference signal is coupled to a digital-to-analog converter 420, the output of which is displayed by display 430 and/or recorded by video recorder 440. Accordingly, each pixel of each of the originally generated video frames is digitally processed, as shown, and then converted back into analog form for display and/or recording.

In each of the memories 200 and 300 a continuously updated exponentially time weighted average is seen to be formed by weighting each successive accumulation by $1−k$ ($0<k<1$) and then adding to it the current image frame weighted by k. In general, the image stored in memory after each successive video frame is as follows for a single point:

| field # | image in memory |
|---|---|
| 1 | $kf_1$ |
| 2 | $kf_2 + (1 − k)f_2$ |
| 3 | $kf_3 + (1 − k)f_2 + (1 − k)^2 f_1$ |
| . | . |
| . | . |
| n | $kf_n + (1 − k)f_{n−1} + \ldots (1 − k)^{n−1} f_1$ |

The corresponding recurrence formula is given generally as $$a(j) = ka(j) + (1−k)b(j)$$

where a(j) denotes an input sample and b(j) denotes an output sample at time j. [In terms of the FIG. 3 embodiment, the expressions for y(t) and z(t), respectively the outputs of recursive filtering subsystem 200 and 300, are $$y(t) = k_1 x(t) + (1−k_1) y(t−T)$$

$$z(t) = k_2 x(t) − (1−k_2) z(t−T)$$

where x(t) is the input to each subsystem.] For n large enough and $k<<1$, the memory content $<x(t)>$ at a time t after the start of imaging is given by $$<x(t)> \approx f(t) * \beta e^{-\beta t}$$

where $\beta = −30 \ln(1−k)$, x(t) is the unfiltered video and * denotes convolution in time. The function $\beta e^{-\beta t}$ is the impulse response of the filter. The frequency response associated with the filter is given by $$H(q) = \frac{k}{q − (1 + k)}$$

where q equals $\exp[−2\pi i \omega T]$, with T being the time between frames, typically 1/30 second. H(q) is a low pass filter function with a single pole at $q = 1−k$.

Figure 1:
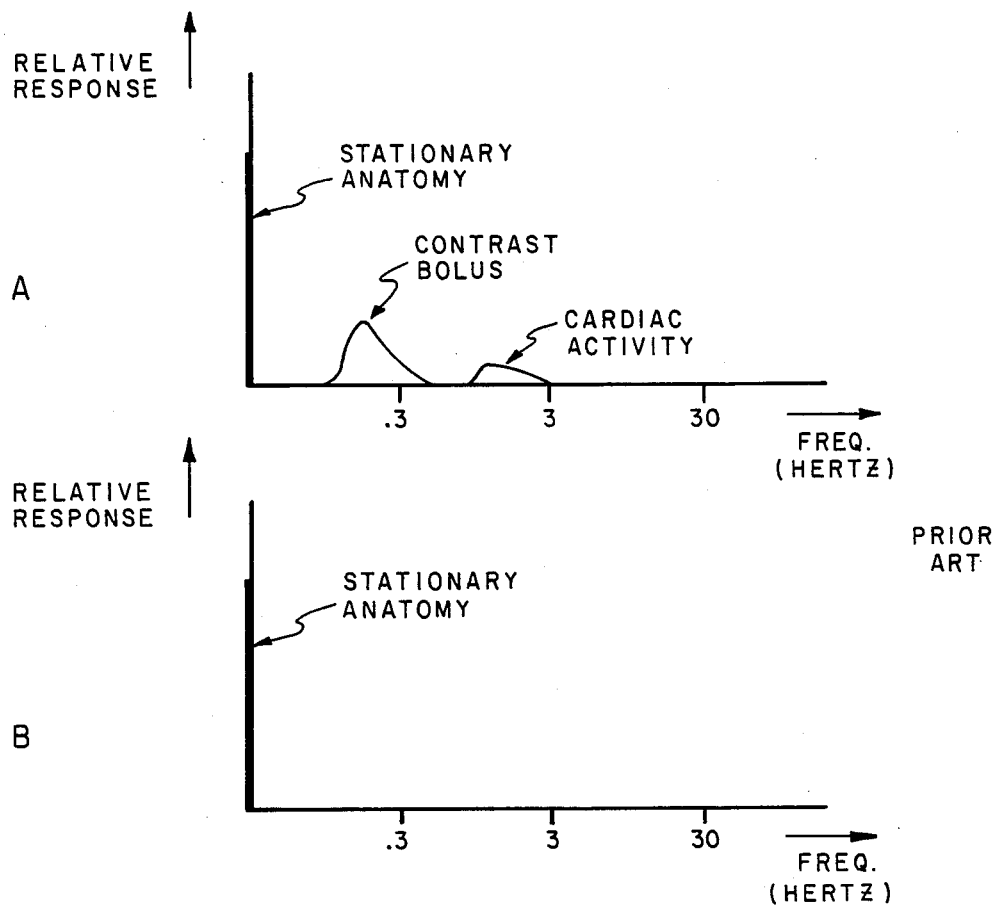
FIG. 1 illustrates typical temporal frequency responses for a prior art mask mode image processing technique.
Figure 2:
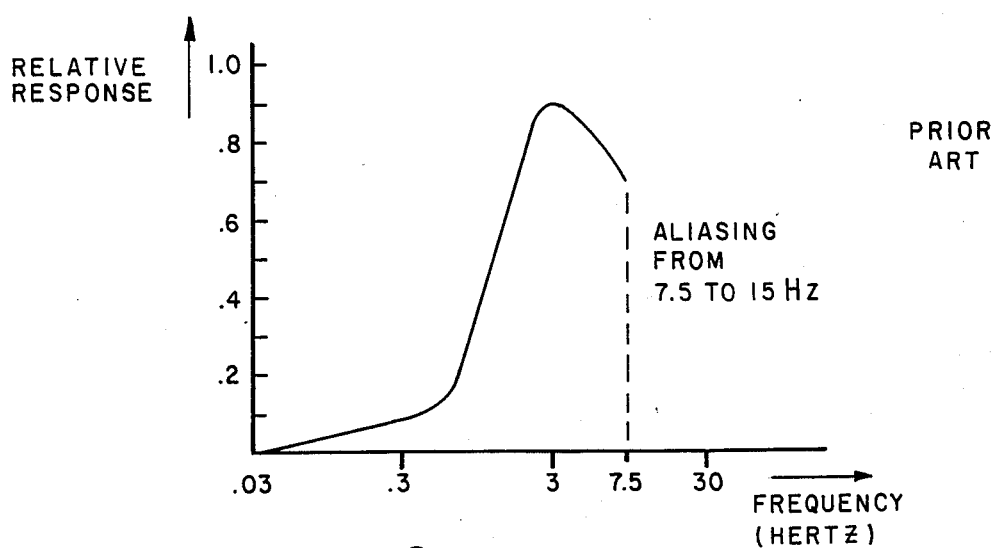
FIG. 2 represents a typical temporal frequency response for a prior art TID image processing technique.
Figure 4:
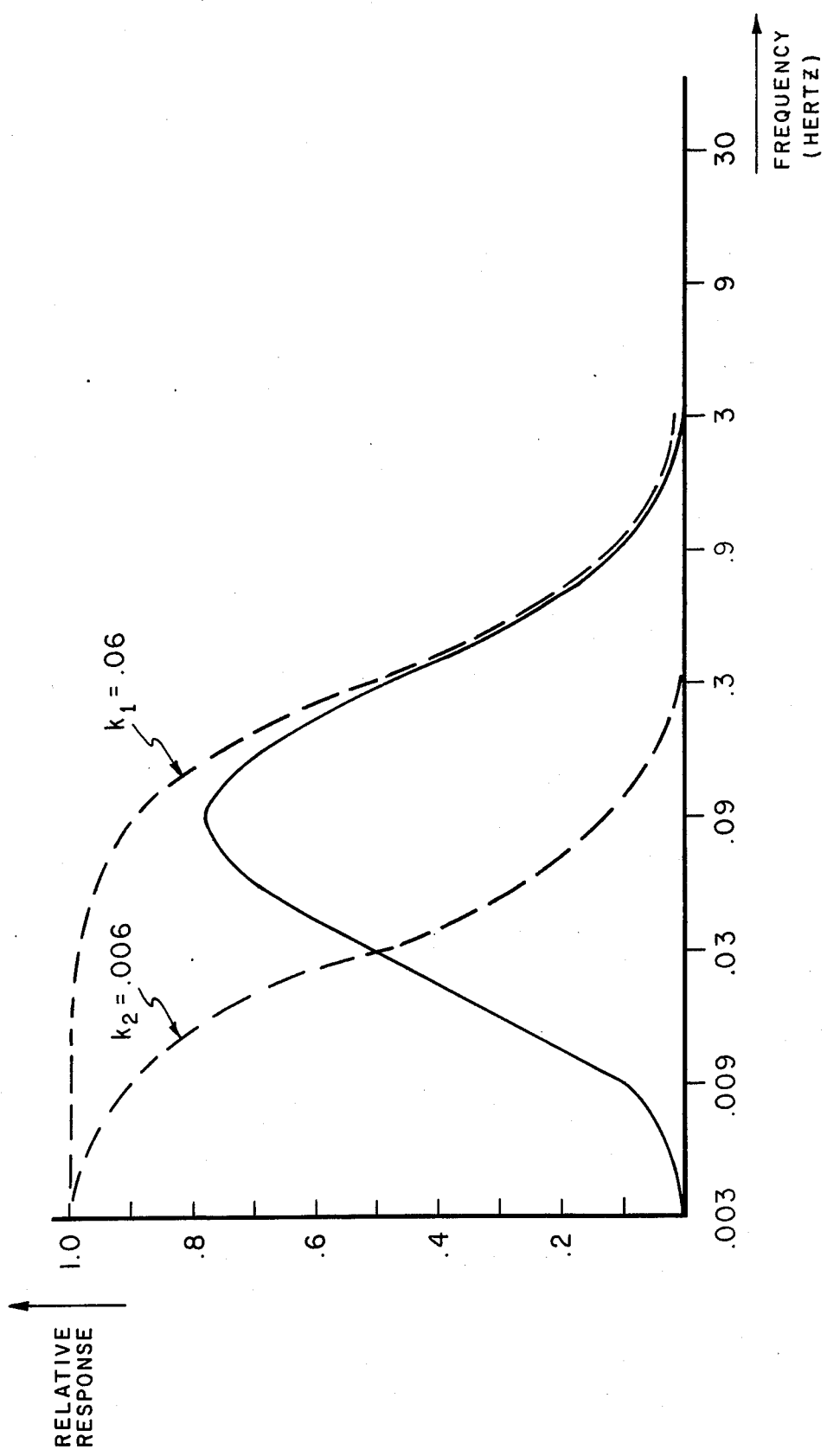
FIG. 4 illustrates the temporal frequency response of the recursive filtering subsystems and the processing system of FIG. 1 for selected system parameters.

Referring to FIG. 4, there is shown the temporal frequency response of an example of the embodiment of FIG. 1 wherein $k_1 = 0.06$ (and the corresponding $\beta_1 = 0.6\pi$) and $k_2 = 0.006$ (and the corresponding $\beta_2 = 0.06\pi$). The rightmost dashed line curve represents the temporal frequency response characteristic of the recursive filtering subsystem 200, and the leftmost dashed line curve represents the temporal frequency response characteristic of the recursive filtering subsystem 300.

The difference thereof, i.e. the output of difference circuit 410, is represented by the solid line curve in FIG. 4. The curve approximates a bandpass frequency response which can be represented as $$H(q) = \frac{[(q−1)(k_1 − k_2)]}{[q − (1 − k_2)][q − (1 − k_1)]}$$

It can be noted that the composite system response peaks in the vicinity of 0.1 Hz, where much of the temporal information associated with a contrast bolus flowing through a peripheral artery would be expected to lie. The response below 0.003 Hz essentially is zero and is negligible above 1 Hz where pulsatile motion due to cardiac contractions is expected to lie.

The recursive filtering subsystems also provide noise reduction of the input video signal. The image noise associated with x(t) is reduced by a factor $$\sqrt{\frac{2−k}{k}}$$

compared with the noise in f(t). For $k_1 = 0.06$, the noise in $<x(t)>$ is a factor 5.6 less than in x(t). For $k_2 = 0.006$, the noise in $<x(t)>$ is a factor 18.2 less than in x(t).

The invention has been described with reference to a particular embodiment, but variations within the spirit and scope of the invention will occur to those skilled in the art. For example, it will be understood that the recursive filtering subsystems can be provided with adjustable k's and, if desired, these weighting coefficients can be dynamically controlled by motion detectors. In this regard, reference can be made to U.S. Pat. No. 4,064,530. Further, it will be understood that appropriate clock and synchronizing signals are conventionally applied to the units which require them in any embodiment.

What is claimed is:

1. Apparatus for generating a processed video signal representative of an image of a body, comprising:
   a source of radiation directable at the body,
   means for detecting radiation received from said body;
   means for converting the detected radiation into an electronic video signal;
   a first recursive filtering subsystem including a first video frame storage means, and first combining means for combining a first fractional portion of the output of said first frame storage means and the unity complement of said first fractional portion of said electronic video signal, the output of said combining means being coupled to the input of said first frame storage means;
   a second recursive filtering subsystem, operating in parallel with said first recursive filtering subsystem, including a second video frame storage means, and second combining means for combining a second fractional portion of the output of said second frame storage means and the unity complement of said second fractional portion of said electronic video signal, the output of said second combining means being coupled to the input of said second frame storage means; and
   means for subtracting the output of said second recursive filtering subsystem from the output of said first recursive filtering subsystem to obtain the processed video signal.

2. Apparatus as defined by claim 1, further comprising means for displaying and/or recording the processed video signal.

3. Apparatus as defined by claim 1, wherein said first fractional portion and said second fractional portion are each selected such that the output of said subtracting means has a temporal frequency response with a single bandpass peak at a temporal frequency substantially corresponding to the temporal frequency of the movement of a bolus of contrast material through a region of the body.

4. Apparatus as defined by claim 1, wherein said first fractional portion is of the order of 0.06, and said second fractional portion is of the order of 0.006.

5. Apparatus as defined by claim 1, wherein the output of said recursive filtering subsystems are taken at the outputs of their respective combining means.

6. Apparatus as defined by claim 1, wherein said converting means includes means for digitizing the electronic video signal.

7. Apparatus as defined by claim 6, further comprising means for converting said processed video signal into analog form.

8. Apparatus as defined by claim 7, wherein said first fractional portion and said second fractional portion are each selected such that the output of said subtracting means has a temporal frequency response with a single bandpass peak at a temporal frequency substantially corresponding to the temporal frequency of the movement of a bolus of contrast material through a region of the body.

9. Apparatus as defined by claim 7, wherein said first fractional portion is of the order of, 0.06, and said second fractional portion is of the order of 0.006.

10. Apparatus as defined by claim 7, further comprising means for displaying and/or recording the processed video signal.

11. Apparatus as defined by claim 16, wherein said first fractional portion and said second fractional portion are each selected such that the output of said subtracting means has a temporal frequency response with a single bandpass peak at a temporal frequency substantially corresponding to the temporal frequency of the movement of a bolus of contrast material through a region of the body.

12. Apparatus as defined by claim 10, wherein said first fractional portion is of the order of 0.06, and said second fractional portion is of the order of 0.006.

13. A device for processing current image information which has been separated into image elements comprising:
   first video processor means comprising a first memory, multiplying and addition circuits connected at least with the first memory to form recursive filter means which fucntions to multiply the current image information by a factor $k_1$, to multiply image information received from an output of the first memory by a factor $(1-k_1)$, with $0 \leq k_1 \leq 1$, to add the resulting products on an elemental basis and to supply the resulting sum to an input of the first memory;
   second video processor means comprising a second memory, multiplying and addition circuits connected at least with the second memory to form a recursive filter which functions to multiply the current image information by a factor $k_2$, to multiply image information received from an output of the second memory by a factor $(1-k_2)$, with $0 \leq k_2 \leq 1$, to add the resulting products on an elemental basis and to supply the resulting sum to an input of the second memory;
   subtraction means connected to outputs of the first video processor means and the second video processor means which function to substract image information in the first video processor means from image information in the second video processor means, the factor $k_1$ being different from the factor $k_2$.

* * * * *

UNITED STATES PATENT AND TRADEMARK OFFICE
CERTIFICATE OF CORRECTION

PATENT NO. : 4,677,478
DATED : June 30, 1987
INVENTOR(S) : Kruger

It is certified that error appears in the above-identified patent and that said Letters Patent are hereby corrected as shown below:

Front page, delete "Stanley Baron" as an inventor

Signed and Sealed this

Seventeenth Day of May, 1988

Attest:

DONALD J. QUIGG

Attesting Officer

Commissioner of Patents and Trademarks